WINDING TRANSPOSITION

Filed April 25, 1961 2 Sheets-Sheet 1

Inventor
William C. Sealey
By [signature]
Attorney

| NUMBER OF CONDUCTORS HIGH | NUMBER OF LAYERS | COMPLETE 180° TRANSPOSITIONS | TOP 180° TRANSPOSITIONS | BOTTOM 180° TRANSPOSITIONS |
|---|---|---|---|---|
| 3 | 2 | 1.3N | 1.87N | |
| 3 | 3 | 2.05N | 2.9N | |
| 3 | 3 | 1N AND 2.26N | 2.9N | |
| 3 | 4 | 2N AND 3.43N | 3.9N | |
| 3 | 4 | 2.15N | 2.58N | |
| 4 | 2 | 1.33N | 1.0N AND 1.67N | 1.0N AND 1.67N |
| 4 | 2 | 1.33N | .75N AND 1.75N | .75N AND 1.75N |
| 4 | 2 | 1.33N | .33N AND 1.86N | |
| 4 | 3 | 2.105N | .47N AND 2.85N | |
Fig. 5
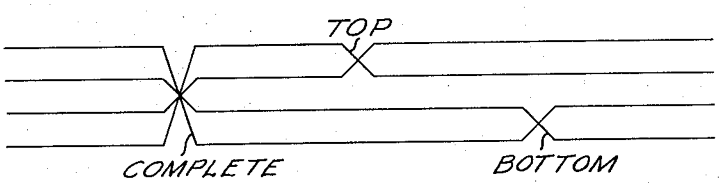
Fig. 6
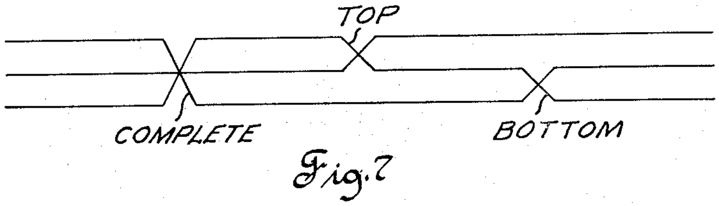
Fig. 7
Inventor
William C. Sealey
By Houston L. Swenson
Attorney United States Patent Office 3,145,358
Patented Aug. 18, 1964

3,145,358
WINDING TRANSPOSITION

William C. Sealey, Milwaukee, Wis., assignor to Allis-Chalmers Manufacturing Company, Milwaukee, Wis.
Filed Apr. 25, 1961, Ser. No. 105,477
5 Claims. (Cl. 336—187)

This invention relates to windings for electrical apparatus and in particular to transposed windings having three or more conductors in two or more layers.

It has been well recognized that in windings designed to carry heavy currents, the losses from eddy currents will be extremely high unless a plurality of parallel connected strands are used. However, in order to obtain maximum efficiency from the use of a plurality of conductors, it is essential that the conductors be so arranged that they have equal flux linkages. With equal flux linkage, the current in the winding will divide uniformly among the conductors. This is because each of the conductors has substantially the same reactance and resistance.

With respect to low current carrying windings, the matter of proper transposition is not difficult to solve. However, when one goes into a higher current carrying winding requiring a plurality of conductors in at least two layers, the matter of transposition becomes more complex. One manner for obtaining a transposition in which four conductors in two layers have equal flux linkage is to arrange each conductor so that it occupies all height positions in lengths equal to the lengths of the other conductors in their respective positions. With such a winding there are eight positions and consequently each of the four conductors must assume all eight positions over equal lengths, thereby requiring seven transpositions.

This invention overcomes the disadvantages of the above type arrangement through the use of 180° transpositions to obtain equal flux linkages for all of the conductors and equalization of the current for each conductor. In this manner the number of transpositions required for more complex windings, such as a two layer, four conductor winding is appreciably reduced thereby providing relatively easier construction.

It is therefore one object of this invention to provide a new and improved 180° transposed multiple layer winding.

Another object of this invention is to provide for a new and improved three or more conductor, multiple layer winding with equal flux linkage for all conductors.

Another object of this invention is to provide for a new and improved transformer winding having a minimum of eddy current loss.

Objects and advantages other than those mentioned above will be apparent from the following description taken in connection with the accompanying drawing in which:

FIG. 1 indicates diagrammatically how a winding having four conductors and a plurality of layers may be transposed in accordance with this invention;

FIG. 5 is a table indicating transposition points in several other types of windings; and FIGS. 6 and 7 are diagrammatic showings of three types of transpositions referred to in the table of FIG. 4 for three and four conductor windings.

Figure 1:
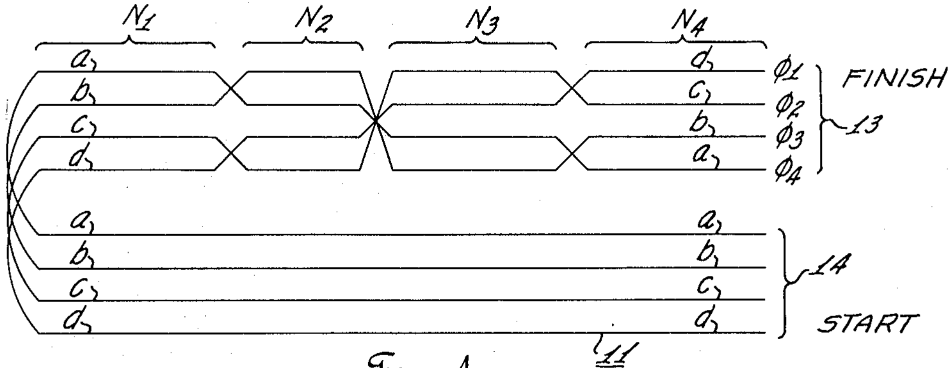
Figure 3:
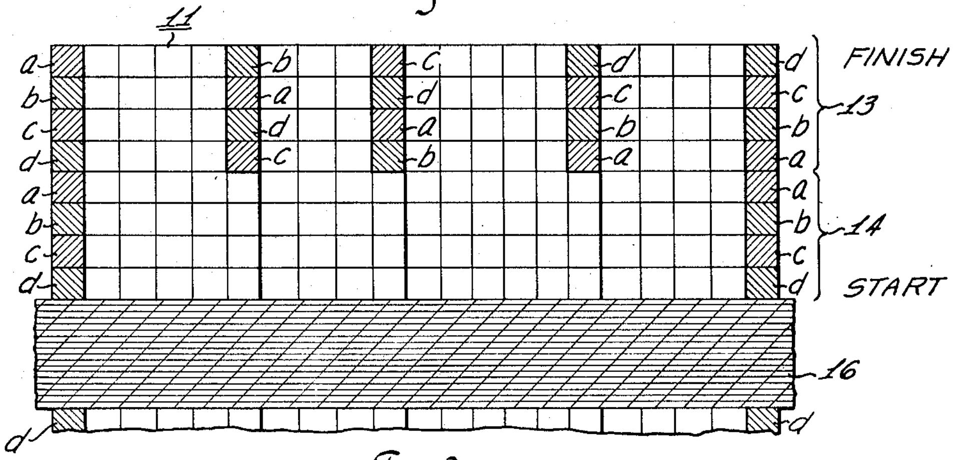
FIG. 3 is a view on a longitudinal plane taken along line III—III of FIG. 2 illustrating the type of transposition shown in FIG. 1 with points of transposition shown in cross section.
Figures 2, 4:
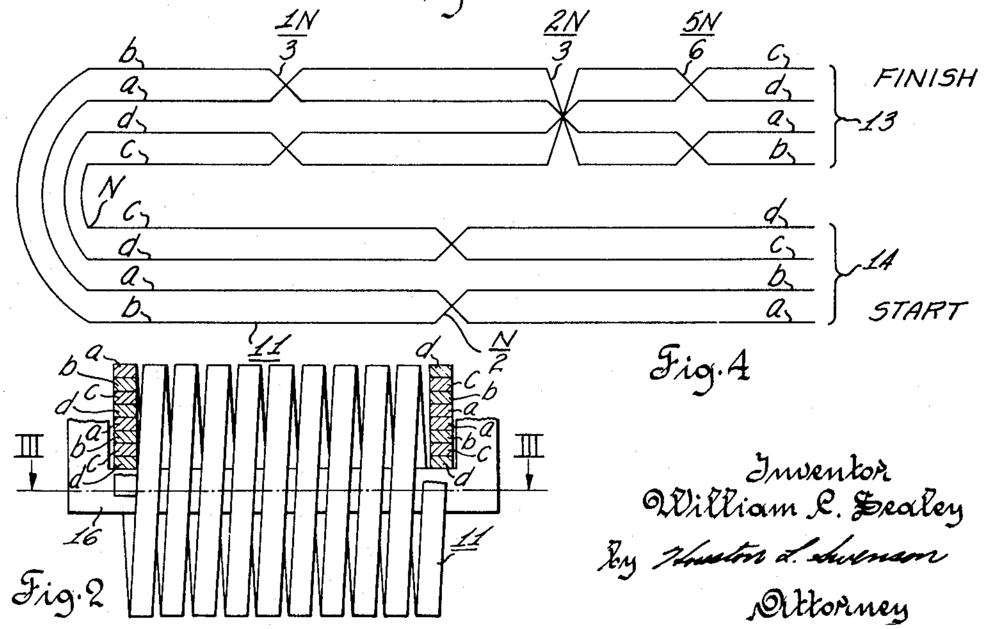
FIG. 2 is a partial view in side elevation of a winding and core leg.
FIG. 4 is a diagrammatic specific embodiment of the transposition in FIG. 1.

With reference to FIGS. 1 through 3, a cylindrically wound winding 11 having a top or outer layer 13 and intermediate layer 14 of four parallel connected stacked conductors $a$, $b$, $c$ and $d$ is shown inductively linked with a core 16. As can be seen in FIG. 2, each conductor forms a cylindrical coil about the core. Layer 14 may comprise a plurality of layers. It is to be noted that there are only three transposition points in the outer layer 13. The intermediate layers 14 may have an infinite number of transposition arrangements. The winding has a total number of N turns per layer with conductors $a$ and $b$ comprising the first pair of wires and conductors $c$ and $d$ comprising the second pair of wires.

For purposes of explanation, a 180° transposition for an even number of conductors is one in which each conductor interchanges its height position relative to the winding's axis with another conductor. For an odd number of conductors, the above applies with the exception that one conductor maintains the same height position. A 180° group transposition comprising several groups, each group having several conductors, is one in which all of the groups interchange their height positions. Thus, in layer 13 the pairs of conductors $a$, $b$ and $c$, $d$ are group transposed 180° at the middle transposition, with individual 180° transpositions occurring on either side.

A general set of equations may be formulated for a multiple layer, four conductor winding in which the outer layer 13 is transposed in accordance with the arrangement of FIG. 1.

$N_1$, $N_2$, $N_3$ and $N_4$=portions of the total number of N turns in the outer layer 13.

$\phi_1$, $\phi_2$, $\phi_3$ and $\phi_4$=the flux linkage for the four heights assumed by the four conductors $a$, $b$, $c$ and $d$ in layer 13.

$\epsilon\phi_a$, $\epsilon\phi_b$, $\epsilon\phi_c$ and $\epsilon\phi_d$=the summation of flux linkage with their respective conductors $a$, $b$, $c$ and $d$ in all of the intermediate layers 14.

$\phi_{av}$=the average flux linkage and is derived by dividing the number of conductors into the total flux linkage for the winding.

Therefore, for:

Conductor $a$, $\phi_1N_1+\phi_2N_2+\phi_3N_3+\phi_4N_4+\epsilon\phi_a=\phi_{av}$
Conductor $b$, $\phi_2N_1+\phi_1N_2+\phi_4N_3+\phi_3N_4+\epsilon\phi_b=\phi_{av}$
Conductor $c$, $\phi_3N_1+\phi_4N_2+\phi_1N_3+\phi_2N_4+\epsilon\phi_c=\phi_{av}$
Conductor $d$, $\phi_4N_1+\phi_3N_2+\phi_2N_3+\phi_1N_4+\epsilon\phi_d=\phi_{av}$ Since the values for the terms $\phi_{av}$, $\phi_1 \ldots \phi_4$ and $\epsilon\phi_a \ldots \epsilon\phi_d$ can all be determined, the four equations may readily be solved for determining the positions of the four unknowns, $N_1 \ldots N_4$. With the exception of where $N_1 \ldots N_4$ have negative values, the above transposition may be solved regardless of the type or number of transpositions in intermediate layers.

If $N_1 \ldots N_4$ are negative, one of the individual 180° transpositions may be moved to a layer with lower flux linkage closer to the core. The terms $N_1 \ldots N_4$ will then be of a positive value. Alternatively, the flux linkages may sometimes be made only approximately equal with negligible increase in eddy loss.

The arrangement of FIG. 4 is a specific embodiment of the electrical winding of FIG. 1 with four conductors in two layers, each conductor assuming less than all eight height positions and having equal flux linkage. With N representing the number of turns in each layer 13 and 14, there is a 180° transposition at point N/2 for the conductors in each pair $a$, $b$ and $c$, $d$ in the intermediate layer 14. At the point N midway between the two layers there is a 180° group transposition between the two pairs and a 180° individual conductor transposition. Considering these tranpositions at N/2 and N as occurring in the intermediate layer 14, equal flux linkage is obtained by applying the preceding equations for determining transposition points in the outer layer 13. Consequently, in the outer layer 13 the two pairs are transposed 180° at point 2N/3 and the individual conductors transposed at point N/3, 2N/3 and 5N/6.

It is to be understood that the arrangement of the three transpositions in the outer layer 13 of the windings in FIG. 1 is only one of a variety that falls within the scope of this invention. For instance, one might prefer a different sequence and number of transpositions in the top layer. Similar equations could be formulated for such variations in which the conductors assume less than all of the height positions and have equal flux linkage through 180° transpositions.

In general the maximum number of 180° transpositions required is one less than the number of wires high. Locating the transpositions in the crossovers between layers and in the final layer maintains all layers except the last layer in a good cylindrical form. Consequently, the winding has maximum mechanical strength in addition to low eddy losses.

For many proportions of conductors the simplest way to make a 180° transposition is to clamp the wires at each side of the desired transposition and twist one end holding the other wire stationary. Where the assembly of wires have a near square cross section a simple twist is easier to perform than bending the wires individually. In such instances, 180° transpositions provide additional advantages in construction of the winding.

Likewise, multiple layers of three conductors can be similarly equated for various transposition arrangements. With reference to FIGS. 5, 6 and 7, a number of arrangements are set forth for 3 and 4 conductor, multiple layer windings. From the table of FIG. 5 it can be seen that there are a number of suitable alternatives for a particular winding. Definitions for top, bottom and complete transpositions referred to in FIG. 5 are shown in FIGS. 6 and 7. Under the column indicating transposition locations, N refers to the number of conductor turns in a single layer. Thus, 1.3N indicates a transposition .3 of the distance into the second layer.

From the several embodiments of this invention which have been illustrated and described, it will be apparent to those skilled in the art that additional changes and modifications may be made therein without departing from the spirit of the invention or the scope of the appended claims.

Having now particularly described and ascertained the nature of my said invention and the manner in which it is to be performed, I declare that what I claim is:

1. A cylindrically wound electrical winding in an induction apparatus, said winding comprising two layers of first and second pairs of stacked conductors transposed 180° at predetermined turns to occupy different height positions within a layer and said conductors in each said pair being further transposed 180° at predetermined turns to occupy different height positions within a layer, each said conductor disposed in less than all eight positions of said two layers and having equal flux linkage.

2. A cylindrically wound electrical winding in an induction apparatus, said winding comprising multiple layers of first and second pairs of conductors, said conductors in each said pair having a 180° transposition in the outer layer at two spaced positions, said first and second pairs being transposed 180° between said two positions, each said conductor being disposed in less than all height positions of said winding and having equal flux linkage.

3. A cylindrically wound electrical winding in an induction apparatus, said winding comprising two layers of first and second pairs of stacked conductors, each said layer having N number of turns, said conductors in each said pair having a 180° transposition in the outer layer at N/3 and 5N/6 turns, said first and second pairs being transposed 180° between said two transpositions at 2N/3 turns, each said conductor being disposed in less than all eight positions of said winding and having equal flux linkage.

4. A cylindrically wound electrical winding in an induction apparatus, said winding comprising at least two layers of at least three stacked conductors, said conductors transposed 180° at predetermined turns to occupy different height positions within a layer, each said conductor disposed in less than all height positions of said two layers and having equal flux linkage.

5. An electrical winding according to claim 4 in which the number of transpositions is one fewer than the number of conductors.

References Cited in the file of this patent

UNITED STATES PATENTS

| | | |
|---|---|---|
| 1,629,462 | Palueff | May 17, 1927 |
| 2,436,188 | Bilodeau | Feb. 17, 1948 |

FOREIGN PATENTS

| | | |
|---|---|---|
| 786,126 | Great Britain | Nov. 13, 1957 |